Aug. 3, 1926.
H. D. TAYLOR
CAR TRUCK
Original Filed May 16, 1924
1,594,644
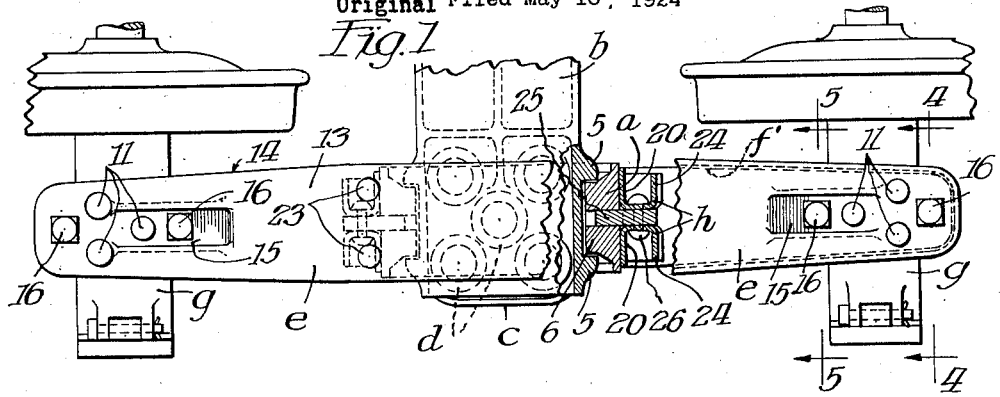
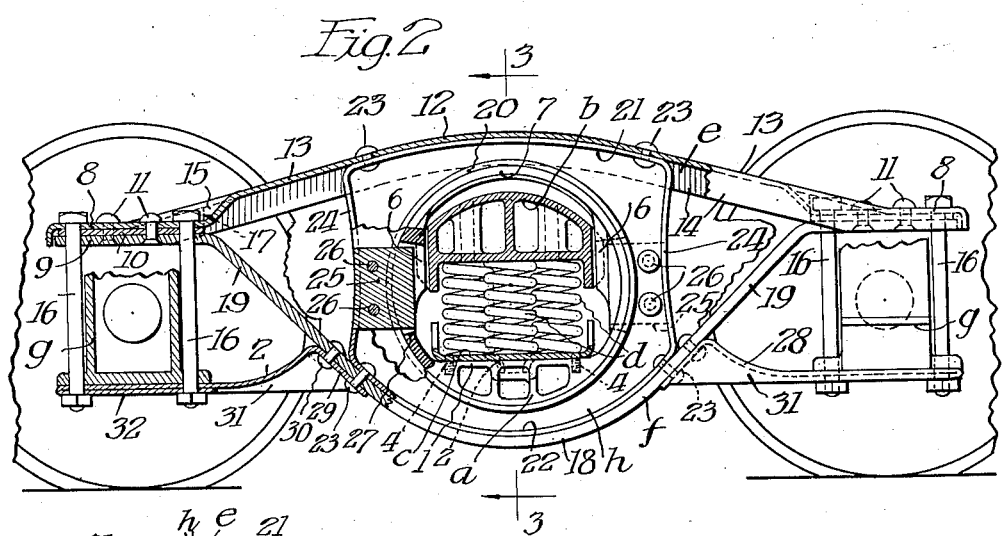
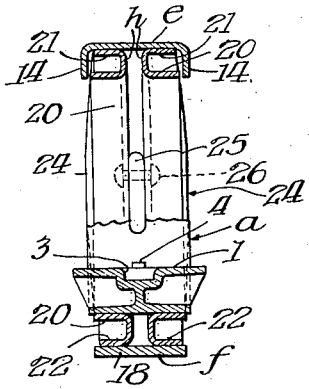
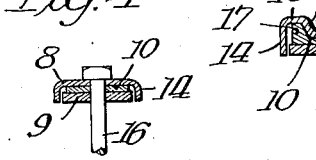
Inventor:
Howard D. Taylor,
By Fisher, Parle, Clapp & Joans,
Attys.

Patented Aug. 3, 1926.

1,594,644

UNITED STATES PATENT OFFICE.

HOWARD D. TAYLOR, OF NEW YORK, N. Y.

CAR TRUCK.

Application filed May 16, 1924, Serial No. 713,676. Renewed March 4, 1926.

The invention relates to car trucks and the invention seeks to provide an improved truck side frame of pressed steel. A further object of the invention is to provide a pressed steel side frame that is adapted for that type of truck on which the side frames are free to rock or oscillate to a limited extent in vertical planes so that all four wheels of the truck can follow irregularities in the track. The invention consists in the features hereinafter set forth, illustrated in the preferred form in the accompanying drawings and more particularly pointed out in the appended claims.
In the drawings:

Fig. 1 is a plan view of one side portion of a car truck embodying the present improvements, parts being shown in horizontal section.
Fig. 2 is a view partially in elevation and partially in vertical section.

Fig. 3 is a detail section on the line 3—3 of Fig. 2, and

Figs. 4 and 5 are detail sections on the lines 4—4 and 5—5 respectively of Fig. 1.

In the preferred embodiment of the invention, the enlarged central portions of the side frames of the truck are provided with circular bearing openings within which carrier rings $a$ are journaled. The carrier rings are interlocked with the car truck side frames in a manner to permit the limited relative rocking movement of the side-frames in vertical planes. The carrier rings $a$ are preferably formed of cast metal and are provided with openings for receiving the ends of the truck bolster $b$ and spring plank $c$. The ends of the spring plank rest upon suitable sills or seats 1 at the lower end of the bolster openings of the carrier rings and have depending studs 2 which extend within sockets 3 in the seats 1 to thereby detachably interlock the spring plank and the carrier rings of the side frames.
Preferably also studs 4 threaded into holes in the seats 1 detachably engage holes or slots formed in the spring plank to limit the movement thereof in a horizontal plane relatively to the carrier rings. The spring plank is preferably formed of pressed sheet steel, has an upturned strengthening edge flange and a portion thereof is offset to form a depending stud 2 at each end of the spring plank. The ends of the cast metal truck bolster $b$ are adapted to be inserted in the enlarged lower end portion of the openings in the carrier rings $a$ and then raised to bring lugs 5 on the bolster into interlocked relation with guides 6 that project from the upper side portions of the carrier rings. The upper portions 7 of the carrier rings that extend between the guides 6 are arched and the upper face of each end of the truck bolster is correspondingly shaped so that the latter may be raised sufficiently to permit the insertion of springs $d$ which support the truck bolster and hold it and the spring plank in interlocked relation with the carrier rings. The parts thus far described are more fully set forth in my companion application Serial No. 713,675 for Letters Patent filed on the same date herewith.

The improved side frame is formed of pressed or wrought steel. It comprises an upper compression member $e$ and a lower tension member $f$ which extend from end to end of the side frame and are provided with horizontal extensions 8 and 9 which are riveted together and form arms for engaging the upper faces of the journal boxes $g$. Preferably, as shown, filler blocks or pieces 10 are inserted between the end extensions 8 and 9 and these parts are rigidly connected as by means of rivets 11.

The compression member $e$ is upwardly arched and has a central arc-shaped portion 12 which merges into downwardly inclined portions 13. The latter merge into the extensions 8 at points in the same vertical planes with the axes of the journal boxes. The compression member is formed of a section of pressed steel plate and has downturned edges forming strengthening flanges 14. Preferably, as shown, the compresion member $e$ gradually tapers in width from its central portion to its ends. Preferably also the corners at its ends are rounded and all of its edges are downturned to form a continuous strengthening flange. Adjacent each end of the compression member, the central parts of the inclined portions 13 are depressed into line with the horizontal extensions 8, thereby forming depressions 15, each of which receives the heads of one of the rivets 11 and of one of the bolts 16 by which the journal boxes are secured to the ends of the side frame. The end portions of the compression member are thus corrugated and strengthened and preferably, as most clearly shown in Figs. 2 and 5, the filler blocks or pieces 10 have integral lugs 17 that fit within the corrugations on opposite sides of the depressions 15.

The tension member *f* is formed of wrought steel, is downwardly arched and has a central arc-shaped portion 18 which merges into the upwardly inclined portions 19 that extend between the central portion and the horizonal extensions 9.

Between the arc-shaped central portions of the compression and tension members are interposed two sections *h* formed of pressed steel plate and having openings defined by out-turned flanges 20 which, in the preferred embodiment of the invention, form the bearing opening for receiving the carrier ring *a*. The sections *h* also have out-turned edge flanges, and the upper and lower portions 21 and 22 of the edge flanges fit the arc-shaped portions respectively of the compression and tension members and are suitably secured thereto as by means of rivets 23. The vertical flanged edges of the sections *h* are preferably arched inwardly to a slight extent, as shown in Fig. 2, and the flanges 24 on these edge portions are preferably arched outwardly to a slight extent, as shown in Fig. 3, so that the central portions of the side frame may better withstand the longitudinal and transverse thrusts brought thereon when in operation. The central pressed steel sections *h* are spaced apart, as most clearly shown in Fig. 3, and cast metal keys 25 fit between them and are secured thereto by rivets 26. The inner ends of the keys extend within sockets 27 in the sides of the carrier ring and interlock the latter and the side frame. The dimensions of the keys and sockets are such that the side frame and carrier ring are held against relative lateral movement, but a limited rocking movement of the side frame in a vertical plane is permitted. The keys also stiffen and strengthen the central portions of the pressed steel sections *h*.

Braces 28 extend outwardly from the tension member *f* to the journal boxes. These braces are preferably formed of pressed steel plate sections and have inclined portions 29 that abut against the inclined portions 19 of the tension member *f* and are secured thereto by the rivets 23 and additional rivets 30. The braces extend outwardly beneath the journal boxes and have openings through which the lower ends of the bolts 16 extend. Preferably, as shown, the side edges of the braces are provided with depending stiffening flanges 31 and an extension 32 on the end of the plate from which each brace is formed, is folded back between the side flanges so that the portions of the braces beneath the journal boxes are of double thickness.

The improved side frame is of strong durable construction and is well adapted for use in a truck in which the side frames are free to oscillate independently to a limited extent and permit the truck wheels to follow irregularities in the track. However, if desired, the flanged openings of the central spacing sections *h* may be readily shaped to receive and interlock directly with the ends of the bolts and spring plank and, in this event, the carrier rings *a* may be omitted. Other changes can be made in the details set forth without departing from the essentials of the invention as defined in the claims.

I claim as my invention:

1. A car-truck side frame comprising compression and tension members extending from end to end of the side frame and having united end extensions forming box-engaging arms, a section interposed between the central portion of said members and having a flanged bearing opening, and a carrier having a bolster opening journaled in said bearing opening, substantially as described.

2. A pressed steel car-truck side frame comprising reversely arched compression and tension members having united end extensions forming box-engaging arms and a spacing section interposed between the central portions of said members and united thereto and having a flanged bearing opening adapted to receive a relatively oscillating, bolster carrier, substantially as described.

3. A pressed-steel car-truck side frame comprising reversely arched compression and tension members having united end extensions forming box-engaging arms and a spacing section interposed between the central portions of said members and united thereto and having a flanged bearing opening adapted to receive a relatively oscillating, bolster and spring carrier, said compression member and said spacing section having stiffening edge flanges, substantially as described.

4. A pressed-steel car-truck side frame comprising reversely arched compression and tension members having united end extensions forming box-engaging arms and a spacing section interposed between the central portions of said members and united thereto, said compression and tension members having arc-shaped central portions merging into tangential inclined portions and said compression member and said spacing section having stiffening edge flanges, substantially as described.

5. A pressed-steel car-truck side frame comprising reversely arched compression and tension members and an intermediate spacing section, said members having united end extensions forming journal-box-engaging arms, said compression member having a curved central portion merging into tangential inclined portions and the latter merging into said end extensions on the vertical planes of the journal box axes, the ends of the inclined portions having central depressions forming stiffening corrugations and seats for the heads of the journal box bolts, and said compression member having depending edge flanges, substantially as described.

6. A pressed-steel car-truck side frame comprising reversely arched, compression and tension members and an intermediate spacing section, said members having united end extensions forming journal-box-engaging arms, said spacing section comprising two vertical plates held in spaced relation and having out-turned edge flanges and central openings provided with out-turned flanges forming a circular bearing for receiving a relatively oscillating bolster and spring carrier, substantially as described.

7. A pressed-steel car-truck side frame comprising compression and tension members having united end extensions forming box-engaging arms, a pair of plate sections spaced apart in parallel relation to each other and to the central longitudinal plane of the side frame and having flanged bearing openings and out-turned edge flanges, the upper and lower portions of which fit and are secured to the central portions of said compression and tension members, a carrier having a bolster opening journaled in the bearing openings of said plate sections, and keys interposed between and secured to the central side portions of said plate sections and engaging said carriers to hold the latter against relative transverse movement but permitting a limited relative oscillating movement thereof, substantially as described.

8. A pressed-steel car-truck side frame comprising compression and tension members tapering from their central portions toward their ends and having united end extensions forming box-engaging arms, spacing plate sections interposed between and united to the central portions of said members and having flanged bolster and spring-plank receiving openings therein, said compression member and said plate sections having stiffening edge flanges, and flanged journal-box braces secured to tension member, substantially as described.

HOWARD D. TAYLOR.